US006686086B1

United States Patent
Martin et al.

(12) United States Patent  
(10) Patent No.: US 6,686,086 B1  
(45) Date of Patent: Feb. 3, 2004

(54) BATTERY RECLAMATION SYSTEM

(75) Inventors: Douglas Martin, Carson City, NV (US); Kristine Burgess, Salt Lake City, UT (US); Todd Leonard, Reno, NV (US)

(73) Assignee: Secor International Inc., Carson City, NV (US)

( * ) Notice: Subject to any disclaimer, the term of this patent is extended or adjusted under 35 U.S.C. 154(b) by 138 days.

(21) Appl. No.: 09/894,889

(22) Filed: Jun. 29, 2001

Related U.S. Application Data
(60) Provisional application No. 60/215,773, filed on Jun. 30, 2000.

(51) Int. Cl.⁷ ............................................. H01M 10/42
(52) U.S. Cl. .................................................. 429/49
(58) Field of Search ............................................ 429/49

(56) References Cited

U.S. PATENT DOCUMENTS

| | | | | |
|---|---|---|---|---|
| 4,118,219 A | | 10/1978 | Elmore et al. ................. 75/103 |
| 4,344,793 A | * | 8/1982 | Burkett et al. ............... 588/234 |
| 4,874,486 A | | 10/1989 | Hanulik ....................... 204/140 |
| 5,120,409 A | | 6/1992 | Hanulik ................... 204/105 R |
| 5,358,549 A | | 10/1994 | Nagel et al. .................... 75/414 |
| 5,407,463 A | | 4/1995 | van Erkel .................... 75/739 |
| 5,437,705 A | * | 8/1995 | DeLisle et al. ............... 75/403 |
| 5,456,992 A | | 10/1995 | Elliott ......................... 429/49 |
| 5,478,540 A | | 12/1995 | Walles et al. ................. 423/99 |
| 5,575,907 A | | 11/1996 | Lindermann ............... 205/580 |
| 5,667,553 A | | 9/1997 | Keegel, Jr. ................ 75/10.63 |
| 5,683,040 A | | 11/1997 | Jakob et al. ................. 241/14 |
| 5,855,645 A | | 1/1999 | Myerson et al. ............. 75/419 |
| 5,858,061 A | | 1/1999 | Kleinsorgen et al. ......... 75/711 |
| 5,891,216 A | | 4/1999 | Washburn et al. ............ 75/670 |
| 5,942,198 A | | 8/1999 | Myerson et al. ............ 423/101 |

\* cited by examiner

Primary Examiner—Patrick Ryan
Assistant Examiner—Thomas H. Parsons
(74) Attorney, Agent, or Firm—Blank Rome LLP

(57) ABSTRACT

A reclamation system is used for mercury-zinc and mercury-cadmium battery disassembly. The mercury-zinc/mercury-cadmium reclamation system has a cooling station, a cracking station, a disassembly station and a shredder station. The cooling station freezes the batteries to facilitate cracking of the housing by the cracking station. The cracked batteries are then disassembled and the battery cells are shredded. The shredded cells are placed in the retort oven, for recovery of mercury. In an alternative embodiment, the reclamation system is used for silver-zinc battery disassembly. The silver-zinc reclamation system has a staging and draining station, cracking station, and disassembly station. At the staging and draining station, wet batteries are separated out and drained. The batteries are then cracked, disassembled and washed. The washed cells are placed in the retort oven, for recovery of mercury.

25 Claims, 5 Drawing Sheets

BATTERY RECLAMATION SYSTEM

CROSS-REFERENCE TO RELATED APPLICATIONS

This application claims the benefit of prior filed U.S. Provisional Application No. 60/215,773, filed on Jun. 30, 2000, which is incorporated herein by reference.

BACKGROUND OF THE INVENTION

1. Field of the Invention

The present invention relates to a battery reclamation system. More particularly, the present invention relates to a battery reclamation system for recycling batteries, and especially batteries having mercury-zinc, mercury-cadmium or silver-zinc.

2. Description of the Related Art

Mercury-zinc and mercury-cadmium batteries contain mercury, which is a land-banned hazardous waste. These batteries are constructed of multiple button cells that are encased in metal, cardboard or epoxy-filled plastic casings or housings. Mercury-zinc batteries include the 9.8-volt, Mark 95, Mark 130, Mark 131, Mark 135 and Mark 141 batteries. The mercury-zinc button cells are primary, non-rechargeable batteries that operate based on the zinc-mercuric oxide system. Mercury-cadmium batteries include the Mark 117 and Mark 121 batteries. The mercury-cadmium button cells are primary batteries that operate based on the cadmium-mercuric oxide system.

Silver-zinc battery cells contain significant amounts of silver and small amounts of mercury. However, the battery owner is not compensated for the silver that is in the batteries, and the owner must purchase new silver for replacement batteries. Mercury-containing silver-zinc batteries include the Mark 53 Modification (Mod) 1, Mark 46 and LR 190 batteries. Each cell has a plastic case with a series of silver and zinc electrodes immersed in an electrolyte solution.

The cell components for the silver-zinc batteries are housed in a plastic case that contains a series of silver and zinc electrode plates, separated by membranes. To activate the cell, the electrodes are immersed in a potassium hydroxide KOH solution. Each membrane separator consists of a cellophane main separator and nylon mesh or felt interseparators. The main separators prevent shorting of the battery by separating the plates, but allow electron transfer through the electrolyte. The interseparators provide space to allow contact between the electrolyte and the plate.

The Mark 53 cells come in two configurations, one by Yardney and the other by BST. The Yardney cell is constructed using a normal wrap assembly, where the silver electrodes are wrapped in membrane separators, and the zinc electrodes are placed in between the wrapped silver plates. The BST cell is constructed using a split wrap assembly, where the silver electrodes are wrapped in membrane separators, and the zinc electrode is also wrapped in a membrane separator and placed between the silver plates.

Silver-zinc cells can be wetted and very spent. These cells have been used and recharged several times, resulting in corrosion and very complete chemical reactions within the cells. It is very difficult to delineate the interior components in these cells. In addition, silver-zinc cells can be used with varying liquid content. These cells have been wetted and used. However, they have not been recharged as many times and are not severely spent. It is possible to easily delineate the interior components of these cells. These cells contain varying amounts of KOH solution, including very wet, slightly wet, and dried out used cells.

SUMMARY OF THE INVENTION

In view of the foregoing, one object of the present invention is to develop a system and method for isolating and recovering the mercury from mercury-zinc, mercury-cadmium and silver-zinc batteries. A further object is to develop a battery reclamation system that recovers silver from silver-zinc batteries for resale or reuse of the silver. Another object is to reduce liability related to handling and disposing of batteries as hazardous waste by performing the recycling activities in a controlled environment. Yet another object of the invention is to provide a method for recycling mercury-cadmium batteries. Still another object is to provide a battery reclamation system that is flexible to accommodate new battery types.

Accordingly, a reclamation system is provided for mercury-zinc and mercury-cadmium battery disassembly. The reclamation system has a cooling or freezing station, a cracking station, a disassembly station and a shredder station. The cooling station freezes the batteries to facilitate cracking of the housing and internal epoxy by the cracking station. The cracked batteries are then disassembled and the battery cells are shredded. The shredded cells are placed in the retort oven, for recovery of mercury.

In an alternative embodiment of the invention, a reclamation system is provided for silver-zinc battery disassembly. The reclamation system has a staging and draining station, cracking station and a disassembly station. At the staging and draining station, wet batteries are separated out and drained. The batteries are then cracked and disassembled. The cells are placed in the retort oven, for recovery of mercury.

These and other objects of the invention, as well as many of the intended advantages thereof, will become more readily apparent when reference is made to the following description, taken in conjunction with the accompanying drawings.

DESCRIPTION OF THE PREFERRED EMBODIMENTS

Figure 1:
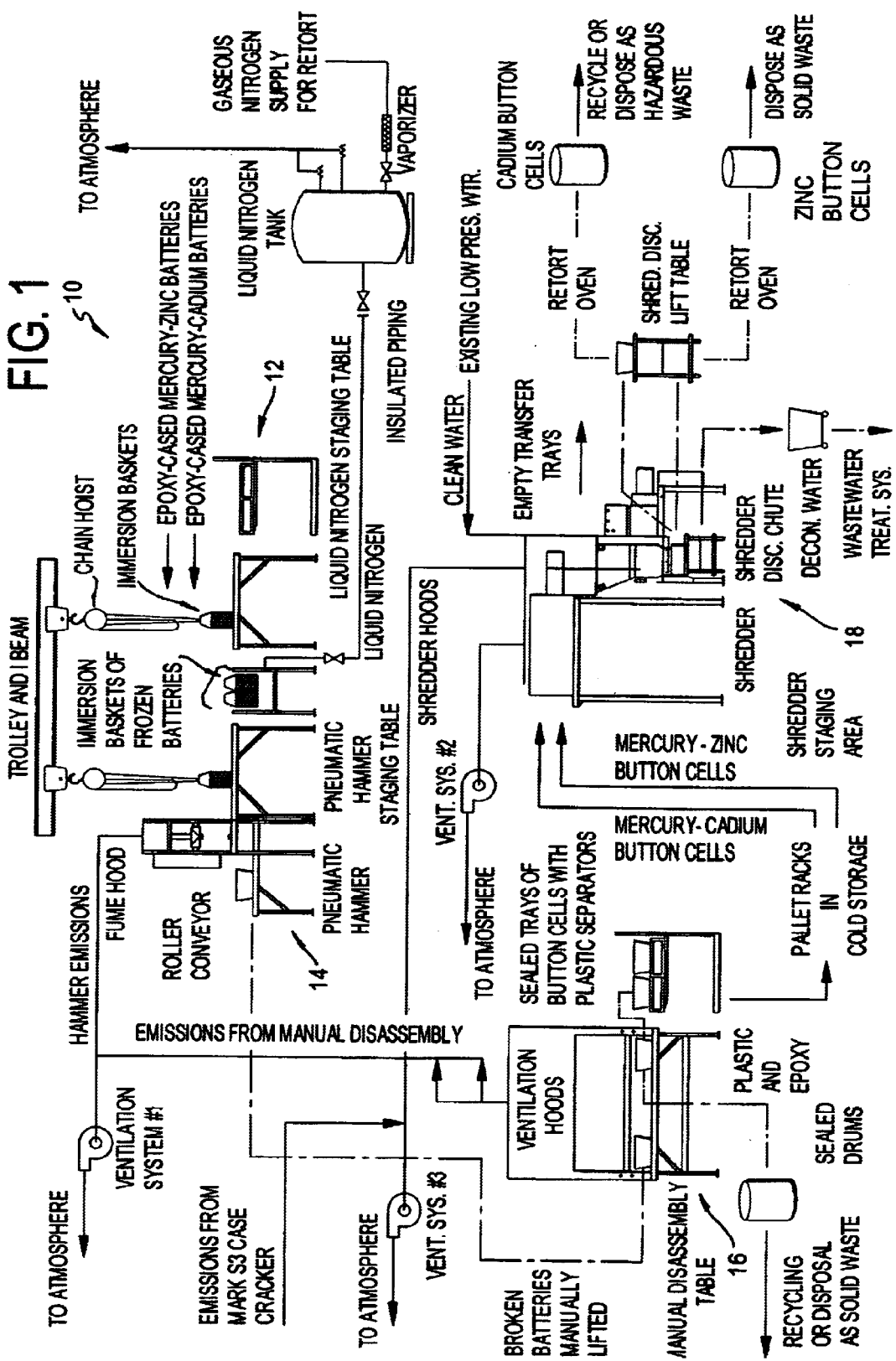
FIG. 1 is a plan view showing the overall system and process for mercury-zinc and mercury-cadmium battery disassembly.

In describing a preferred embodiment of the invention illustrated in the drawings, specific terminology will be resorted to for the sake of clarity. However, the invention is not intended to be limited to the specific terms so selected.

Turning to the drawings, FIG. 1 is an overview of the reclamation system 10 for mercury-zinc and mercury-cadmium battery disassembly in accordance with the present invention. The reclamation system 10 has a cooling station 12, a cracking station 14, a disassembly station 16 and a shredder station 18. The reclamation system 10 also includes a retort system 30, which will be discussed with reference to FIG. 4 below.

The freezing or cooling station 12 is the initial stage of processing the batteries. The cooling station 12 has a staging table that receives the batteries. The cooling station 12 includes a transportation device comprising immersion baskets that are connected to a trolley beam by a hoist that travels along the beam. At the staging table of the cooling station 12, the batteries are placed in the immersion baskets and transported to a liquid nitrogen contact chamber. The basket is lowered by the hoist into the liquid nitrogen chamber.

The liquid nitrogen contact chamber freezes the epoxy-cased mercury-zinc and mercury-cadmium batteries to approximately −320° F. using liquid nitrogen. The batteries are retained in the liquid nitrogen for a minimum freezing time of about 30 minutes. The freezing process makes the epoxy interior brittle, which in turn facilitates subsequent breaking of the cases using the cracking station 14. The liquid nitrogen chamber can preferably accommodate two baskets at one time, each basket holding up to 15 Mark 117batteries. However, any suitable number of baskets can be accommodated, within the scope of the invention.

Liquid nitrogen is supplied to the chamber from an aboveground, pressurized storage tank. The storage tank is located as close to the contact chamber as possible to minimize the length of insulated transfer piping, and thereby minimize any heat transfer. Alternatively, a vaporizer option can be mounted to the cooling system for piping of nitrogen to the retort oven 30 (FIG. 4) if an inert atmosphere is required during the retorting process. Liquid nitrogen that is vaporized during the freezing process is vented through a flexible hose that is connected to the contact chamber.

When the immersion is complete, the hoist raises the immersion basket and transports the batteries to an exit staging table for the cracking station 14. The frozen batteries are removed from the immersion basket and sent to the cracking station 14. The cracking station 14 includes a pneumatic hammer that cracks the frozen batteries to remove the epoxy housings. The cracking occurs as quickly as possible after the batteries are removed from the liquid nitrogen, since the batteries become more difficult to crack after sitting out of the liquid nitrogen for more than 10 minutes. Preferably, the batteries are cracked within about thirty (30) minutes from the time they are removed from the liquid nitrogen. Further immersion may be required if left out longer than 30 minutes.

Figure 2:
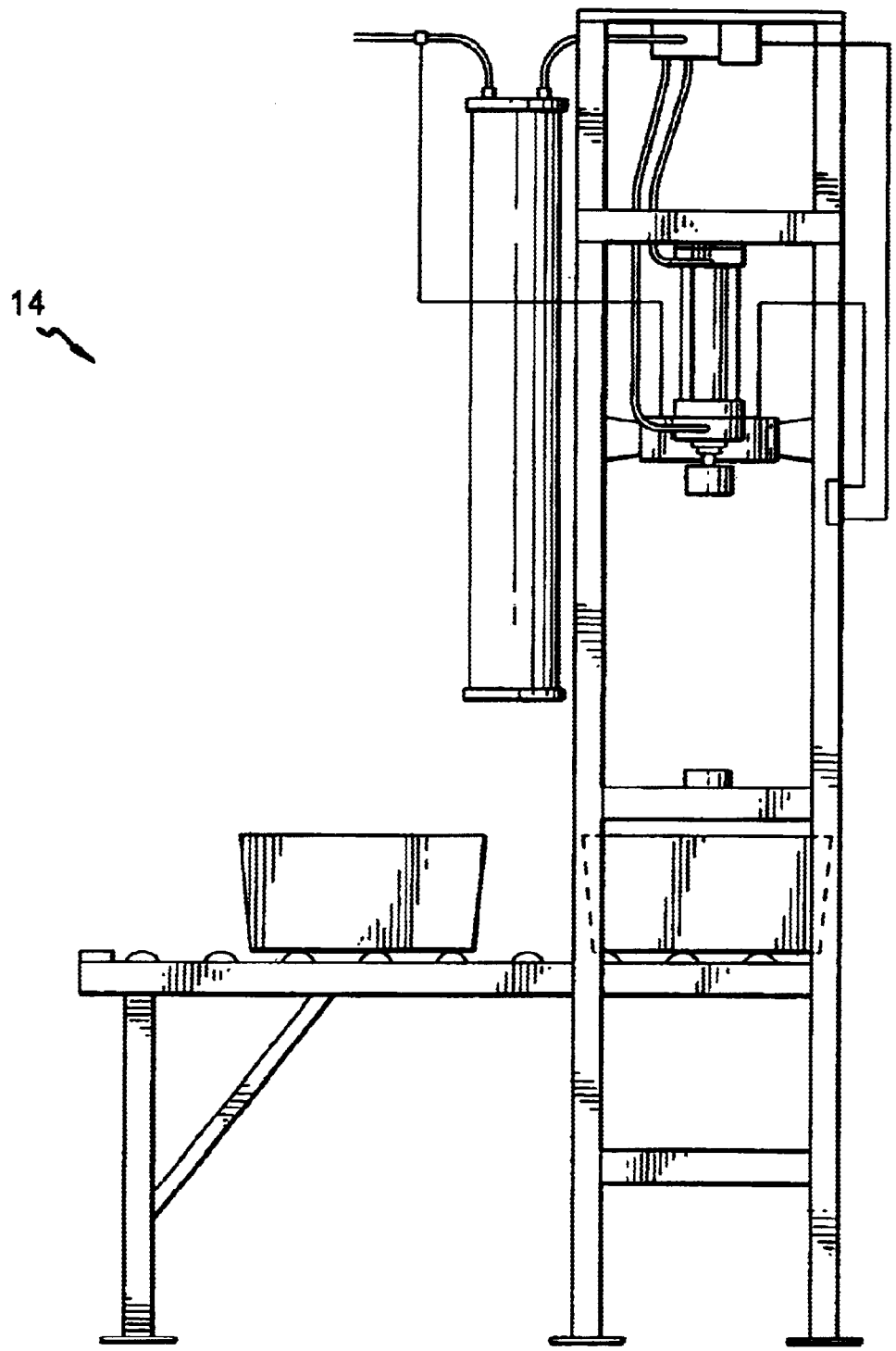
FIG. 2 is a plan view of a pneumatic hammer for the cracking station.

FIG. 2 is a detailed drawing of the cracking station 14. The cracking station 14 includes an air driven shaft and head that delivers a force approximately equal to a 65-pound weight that is dropped about 18–24 inches. The striking head strikes the battery, which is held in place by battery mounts. The striking plate ends approximately ¼-inch to ½-inch prior to hitting the battery mounts. The pneumatic hammer has a Plexiglas enclosure. The front of the enclosure has a door so that the operator can insert and remove batteries. The door includes a sensor so that the hammer only operates when the door is closed. The bottom of the enclosure is open so that the battery pieces can be brushed off of the mount and fall into the containers positioned below the hammer. The enclosure walls extend down to within about 3 inches of the top of the container to contain the debris and direct the debris into the container.

The cracked batteries drop into the transfer tray with tightly fitting lids that has been painted with epoxy for chemical exposure protection. The transfer trays are positioned directly beneath the pneumatic hammer, and the batteries drop down into the tray. Tray lids are sealed while the tray is still positioned beneath the hammer. The trays are then placed onto a mobile lift table. A fume hood is also provided to ventilate potential mercury emissions.

In accordance with an alternative embodiment of the invention, an air cylinder actuator can be used instead of a pneumatic hammer. The air cylinder has a piston that is driven by compressed air that can be used to impart a comparable force to the batteries. The air cylinder provides a quick impact to the battery.

Returning back to FIG. 1, the sealed trays of cracked batteries are transported on mobile lift tables from the cracking station 14 to the disassembly station 16. The lids remain sealed to the trays until the trays are located within a hooded and vented area of the disassembly station 16. At the hooded disassembly tables, the lids are taken off and the cracked batteries are removed. The plastic and epoxy are removed from the mercury-laden button cells, usually by slapping the piece on the hard surface of the table. Hammers and chisels may augment this process. The plastic and epoxy are transferred to sealed drums for disposal as solid waste.

The button cells are placed into dedicated plastic transfer trays with tightly fitting lids. The cells are placed in layers that are separated by plastic separators to prevent short-circuiting due to contact between the cells. The sealed plastic trays of button cells are loaded directly from the manual disassembly tables onto standard pallets. The cells are transported to a refrigerator for cold storage until the cells are ready to be shredded. The cells are kept in cold storage to reduce the potential of the batteries shorting.

The button cells are stored in the refrigerator in the sealed plastic transfer trays until the retort becomes available. Of course, if the retort is available, then it is not necessary to store the trays in the refrigerator. Once the retort is available, the trays are transported to an elevated shredder staging area of the shredder station 18. The button cells are fed to the shredder feed hopper through a feed chute that is integral to the shredder exhaust hood. Empty trays and plastic tray insert (separators) are decontaminated. The separators reduce the potential of the batteries shorting.

The shredder feed directs particulate emissions to an exhaust hood. The shredder has a high-torque, low-speed design with a partitioned cutting chamber. One part of the chamber is about ⅔ of the total chamber length and has cutters with about 0.5 inch width, which are designed to shred battery cells 1.5 inches in diameter by 0.375 inches thick. The other ⅓ of the chamber has cutters with about 0.25 inch width, which are designed to shred battery cells 0.5 inches in diameter by 0.25 inches thick. The partition extends from the top of the feed hopper to the cutters. The shredder includes an auto-reverse feature to dislodge materials that have bound up in the shredder teeth.

Figure 4:
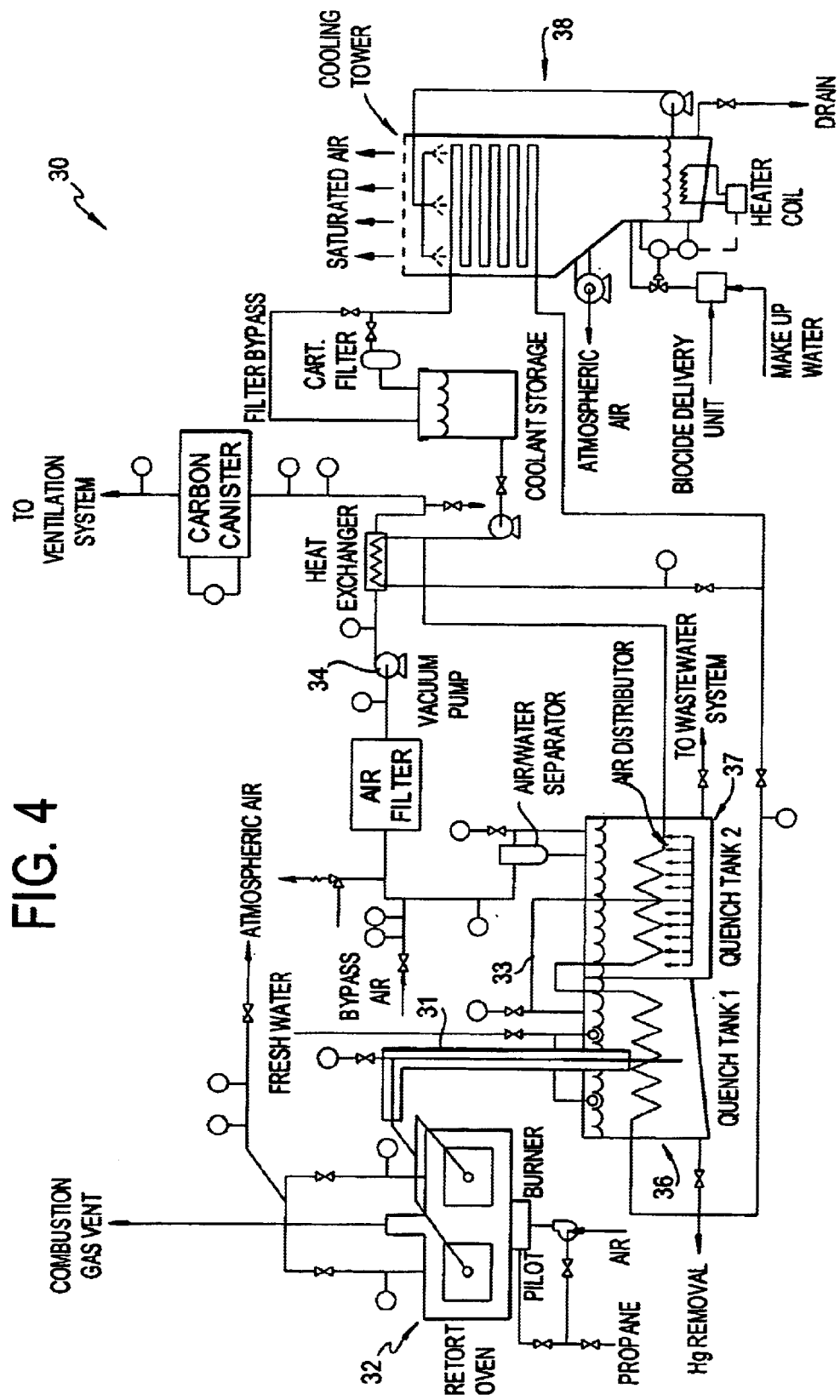
FIG. 4 is a plan view of the retort system and process.

Shredded cells discharge from the bottom of the shredder through a shredder discharge chute directly into a retort tray. The tray is placed under the shredder on a dedicated mobile lift table. This table has a range of motion that permits trays to be elevated to the level of the retort oven. When the retort tray is full, it is lowered, covered with a lid, and transported to the retort (FIG. 4).

The overhead hood on the shredder provides vapor control at the discharge chute. The retort tray can be raised up at least ½-inch into the discharge chute, so that only a very small opening exists around the edge of the tray and chute. A cover is placed over the tray, to reduce mercury emissions. The shredder is periodically decontaminated to remove caustic material and minimize corrosion of shredder components. Shredder decontamination water is transported via a quick connect pipe to a wastewater treatment plant. The shredder can process approximately 1,000 to 18,000 9.8 cells per hour without binding. The speed of operation, however, is dependent upon the battery size and configuration.

Figure 3:
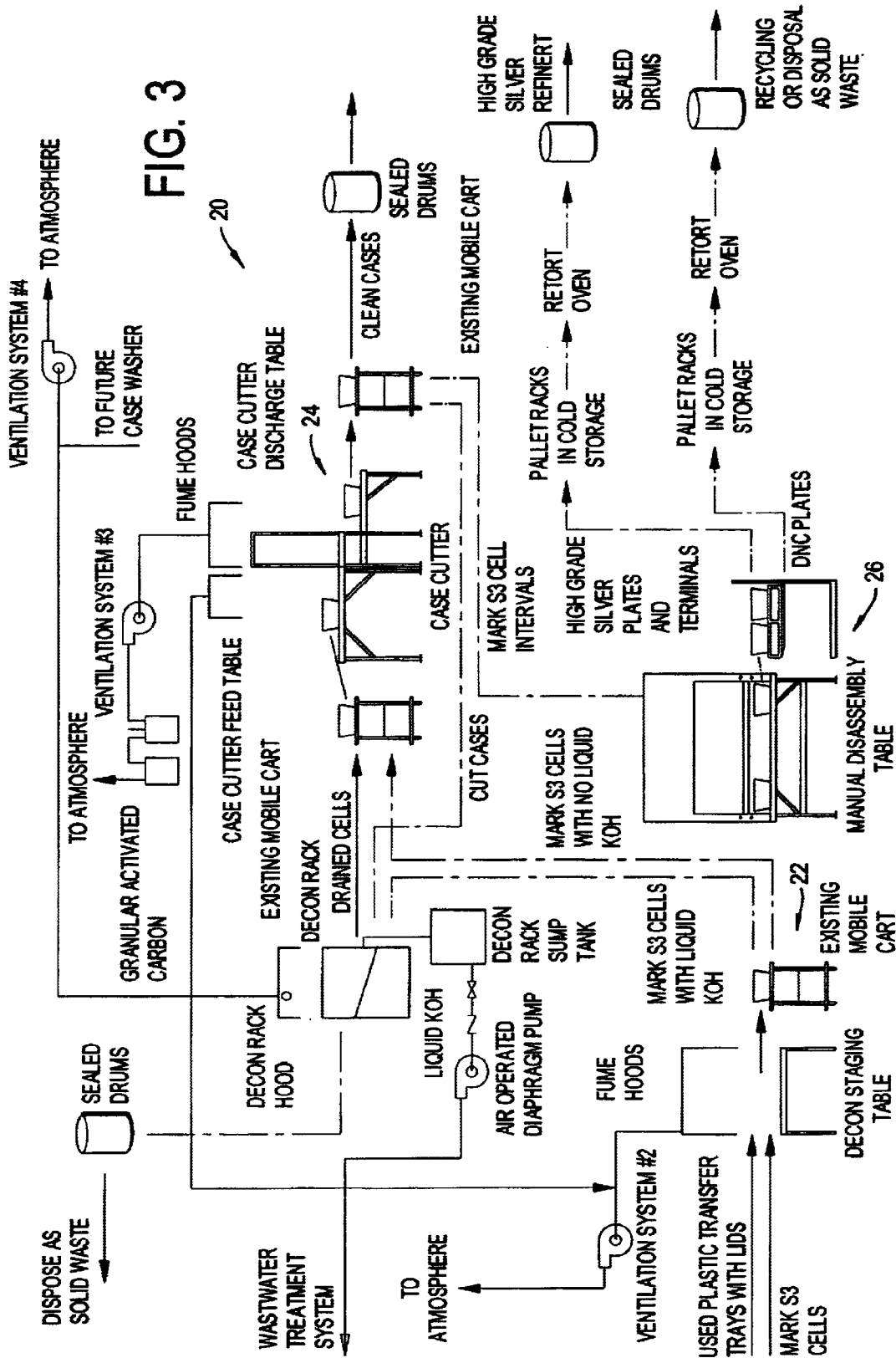
FIG. 3 is a plan view showing the overall system and process for silver-zinc battery disassembly.

FIG. 3 is an overview of the reclamation system 20 for silver-zinc battery disassembly in accordance with the present invention. The reclamation system 20 has a staging and draining station 22, case cutting station 24 and disassembly station 26. High-silver content can be separated from low-silver content. The reclamation system 20 also includes a retort system 30, which will be discussed with reference to FIG. 4 below.

At the draining station 22, battery cells (such as Mark 53 cells) are moved into the battery reclamation system 20 and staged on a hooded decontamination staging table. The decontamination staging table is also used for decontamination of equipment, such as used transfer trays. Wet cells (i.e., cells containing liquid KOH) are segregated from cells that do not have liquid KOH. The wet cells are placed in sealed transfer trays and transported by mobile lift cards to the deontamination rack for draining.

The wet cells are placed upside down on a decontamination rack for draining prior to case cracking. A basin that is sloped to drain captures the liquid KOH. The drying rack is covered with a hood to capture mercury vapors. The accumulated liquids drain to a decontamination rack sump tank, which is then pumped to a wastewater treatment plant. The cells without liquid KOH are placed in separate sealed transfer trays and are transported by mobile lift carts to the case cracker feed table. The drained cells are placed on a hooded case cracker feed table, with the cells without liquid KOH. Since the KOH is caustic and will contain mercury, the liquid collection system is constructed with materials that are compatible with the caustic liquid, such as polyethylene. Accumulated liquids are neutralized with dilute acid and transferred to the case washer water treatment system.

The cell case must be removed to get to the interior electrode components so that they can be separated. At the case cutting station 24, the cells are placed into a pneumatic case cutter having a cutting blade assembly, and the plastic cases are removed by cutting off their ends. The case cutter 24 has a blade attached to a vertical shaft. The cutter cuts off the top and bottom of the battery. Either one or two cuts is necessary, depending upon the type of battery being cut. It should be noted that since the silver-zinc batteries are not encased in epoxy, they do not need to be frozen to be disassembled. The cutting area, feed table, and discharge areas are fully enclosed with Plexiglas to contain splattering sludge and liquids. The case cutter 24 permits cut case pieces to fall into a plastic transfer tray that is located directly beneath the case cutter.

The cut cells are then placed on a hooded case cutter discharge table, where cell internals (i.e., negative and positive plates) are removed from the plastic cases and placed into sealed plastic transfer trays. The cell internals are transported by a mobile cart to a disassembly table for further separation. Cut cases are placed into sealed plastic transfer trays and transported to the decontamination area 22. Approximately 60 Mark 53 cases can be cut per hour.

The sealed cell internals are transported to the hooded disassembly station 26. The cell internals include high-grade silver plates and terminals, and zinc plates. The high-grade silver plates and terminals (about 90–100% silver) are separated from the zinc plates. The high-grade silver plates and terminals are placed in dedicated labeled sealed transfer trays. The zinc plates are placed in separate dedicated labeled sealed transfer trays. The sealed trays are transported from the manual disassembly tables to the refrigerator for cold storage until the retort is available.

The retort station 30 is shown in FIG. 4, and is for use with the material from the reclamation systems 10, 20 of FIGS. 1 and 3, respectively, though can be used for any suitable material. The retort process uses heat and vacuum to volatilize elemental mercury into a gaseous form. In addition to volatilizing elemental mercury, the high temperatures catalyze the reduction of mercuric oxide into elemental mercury. The vacuum enhances the volatilization process and also provides the gas flow from the oven to the quench tank for removing the vapor phase mercury from the retort oven. Gaseous elemental mercury is condensed and removed as a liquid product.

The retort station 30 includes a retort oven 32, a vacuum pump or a blower 34, quench tanks 36, 37, and a cooling tower 38. The retort oven 32 has two heating chambers with a total volume of 10 cubic feet and can accommodate six trays of material. The oven operates with either ambient air or nitrogen (which controls combustion) as a carrier gas that transports the mercury to the quench tank. The oven doors are sealed with compressible thermally-resistant ceramic material to minimize leaking of ambient air around the doors.

Shredded cells from the reclamation system 10 of FIG. 1 are transported from the shredder to the retort in covered, retort trays that have tight fitting covers that prohibit the transmission of mercury gases. The boiling point of mercury is about 673° F., so that an average oven temperature of <1,000° F. is preferably used for volatilization of mercury while minimizing volatilization of other battery constituents. The inlet air is preheated and the oven doors are sealed to reduce the temperature gradient between the front and back of the retort oven 32. To account for a temperature gradient of about 250° F., the oven can be set to 1,000° F.

Air flow through the retort system is provided by an air-cooled blower 34, which is connected downstream of the quench tanks. The air flows through the retort oven 32, to the quench tanks to the heat exchanger to the ventilation system. An insulated pipe 31 connects the retort oven 32 to the first quench tank 36. Alternatively, a water-cooled liquid ring pump can be provided between the quench tanks to move the air through the retort oven, quench tank, heat exchanger and ventilation system. An air/water separator is provided to dry out the air that flows to the air filter, heat exchanger and carbon canister.

Mercury-laden vapors from the retort oven 32 flow directly into the first quench tank 36, which is partially filled with water. The quench tanks 36, 37 include cooling coils, shown as saw-shaped lines that are filled with non-contact cooling water from an evaporative cooling tower. The cooling water is contained in a pipe so that it does not contact the mercury water. The coils are located below the quench water level to cool the quench water. The cooling coils provide condensation of gaseous mercury to the liquid form. This provides clog-free air cooling between the oven and the quench tanks.

A two-inch pipe 31 extends from the retort oven 32 to below the surface of the water in the first quench tank 36. Vaporized mercury from the retort oven 32 proceeds through the pipe 31 into the water of the first quench tank 36. Preferably, the pipe 31 extends to just above the cooling coils and directs the vaporized mercury into the cooling coils. The water cools the mercury to a liquid, which then sinks to the bottom of the first quench tank 36. The bottom of the first quench tank 36 is sloped, so that the liquid mercury that sinks to the bottom can be collected and drained out.

The first quench tank removes over 90%, and as much as 97% or more, of the mercury, though the actual amount removed depends upon the mercury content, the water temperature and the resonance time. The mercury that remains in vapor form passes to the head area above the water in the first quench tank 36. The blower 34 pulls the air in the head area from the first quench tank 36 through the pipe 33 to the second quench tank 37. The air is then forced through an air distributor, which is located at the bottom of the second quench tank 37.

The air proceeds from pipe 33, and is forced through orifices in the air distributor into the water in the second quench tank 37. The air bubbles out of the orifices and any remaining mercury is cooled by the water and enters the liquid form. The air distributor is preferably located below the cooling coil so that the air bubbles up through the cooling coil. The liquid mercury falls to the bottom of the second quench tank 37. Since most of the mercury has already been removed, the second quench tank 37 captures minute amounts of mercury that can be removed periodically.

Of course, the second quench tank 37 may not be needed, depending upon the amount of mercury that is desired to be removed. The air distributor is a manifolded pipe, and the orifices are ¼–⅛-inch in diameter. The air distributor improves the vapor-liquid contact. The air distribution system maximizes contact/retention or resonance time to the chilled water and increases removal efficiency.

In accordance with an alternative embodiment of the invention, mercury can be condensed and collected by a mercury condenser and collector, instead of the quench tanks. A non-contact cooling water is used to cool the gas stream coming from the retort oven to condense out the elemental mercury into a liquid form. Heated water is pumped out to a cooling tower and the cooled water is pumped back. The mercury collector pulls the vapor from the condenser through a drop tube into the water. The bubbles of vapor collapse as they rise toward the surface of the tank, causing the mercury to condense into a liquid form.

Condensed mercury falls to the bottom of the collection tank. A second water tank is used to remove additional mercury from the vapor stream. Air leaving the second collection compartment is treated with a granular activated carbon emission control device. Condensed mercury is removed by opening a valve at the bottom of the collection tank. However, the quench tanks are preferred since the mercury condenser tends to clog.

Cooling water for the quench tank cooling coils is provided from an evaporative cooling tower 38. The cooling tower 38 includes antifreeze and coolant filters to provide capability for winter operation by filtering the impurities in the coolant that protects the tower from freezing. Residual gaseous mercury in the vapors downstream of the quench tanks 36, 37, is recovered by adsorption onto iodated activated carbon. The carbon is changed out periodically, with the spent material being recycled back into the retort oven for mercury recovery.

Each retort cycle requires approximately 8 hours of heating to remove all of the available mercury from the materials being processed. Cooling requires an additional 2 hours. Thus, each retort cycle will require about 10 hours or more. Each retort cycle can process about 200 Mark 141 Mod 1 (18), or 1000 Mark 135 Mod 0 (8), or 40 Mark 131 Mod 0 (8), or 293 Mark 130 Mod 0 (64), or 507 Mark 121 Mod 0 (6), or 507 Mark Mod 8 (48), or 1300 9.8 (7) or 90 Mark 117 Mod 0 (18) batteries (cells) per retort cycle, or about 70–120 Mark 53 cells per retort cycle. However, any suitable batteries can be processed within the scope of this invention.

The retort station 30 is used to remove mercury from the materials or substances listed in Table 1, though any suitable elements can be removed. Once mercury is removed, the solid residual materials are recycled or disposed, as further indicated in Table 1. The mercury is forwarded to a mercury distiller for purification. High-grade silver components are retorted in separate batches than other materials to maintain a high silver content in the material that is to be sent to a silver refinery. This minimizes silver processing costs.

TABLE 1

| Material to be Processed in Retort | Disposition After Retort |
| --- | --- |
| Shredded mercury-zinc button cells | Dispose as solid waste or recycle |
| Shredded mercury-cadmium button cells | Dispose as hazardous waste or recycle |
| High grade silver components (such as from Mark 53 silver-zinc cells) | High grade silver refinery |
| Zinc plates (such as from Marc 53 batteries) | Recycle or dispose as solid waste |
| Spent iodated activated carbon from the retort system | Retort and regenerate |
| Wastewater treatment sludge | Dispose as hazardous waste |
| Sponges and decontamination materials from the disassembly areas | Dispose as solid or hazardous waste |

Shredded mercury cadmium button cells are retorted in separate batches than other material to minimize the quantity of cadmium-containing waste. Due to the cadmium content, disposal of this waste stream as hazardous waste may be required. Zinc plates are segregated for recycling by a suitable zinc recycling facility. The remaining waste streams are retorted together since the residual solids can be disposed as non-hazardous solid waste. Plastic, epoxy and metal casings can be disposed of as non-hazardous solid waste or can be sent to appropriate recycled.

Figure 5:
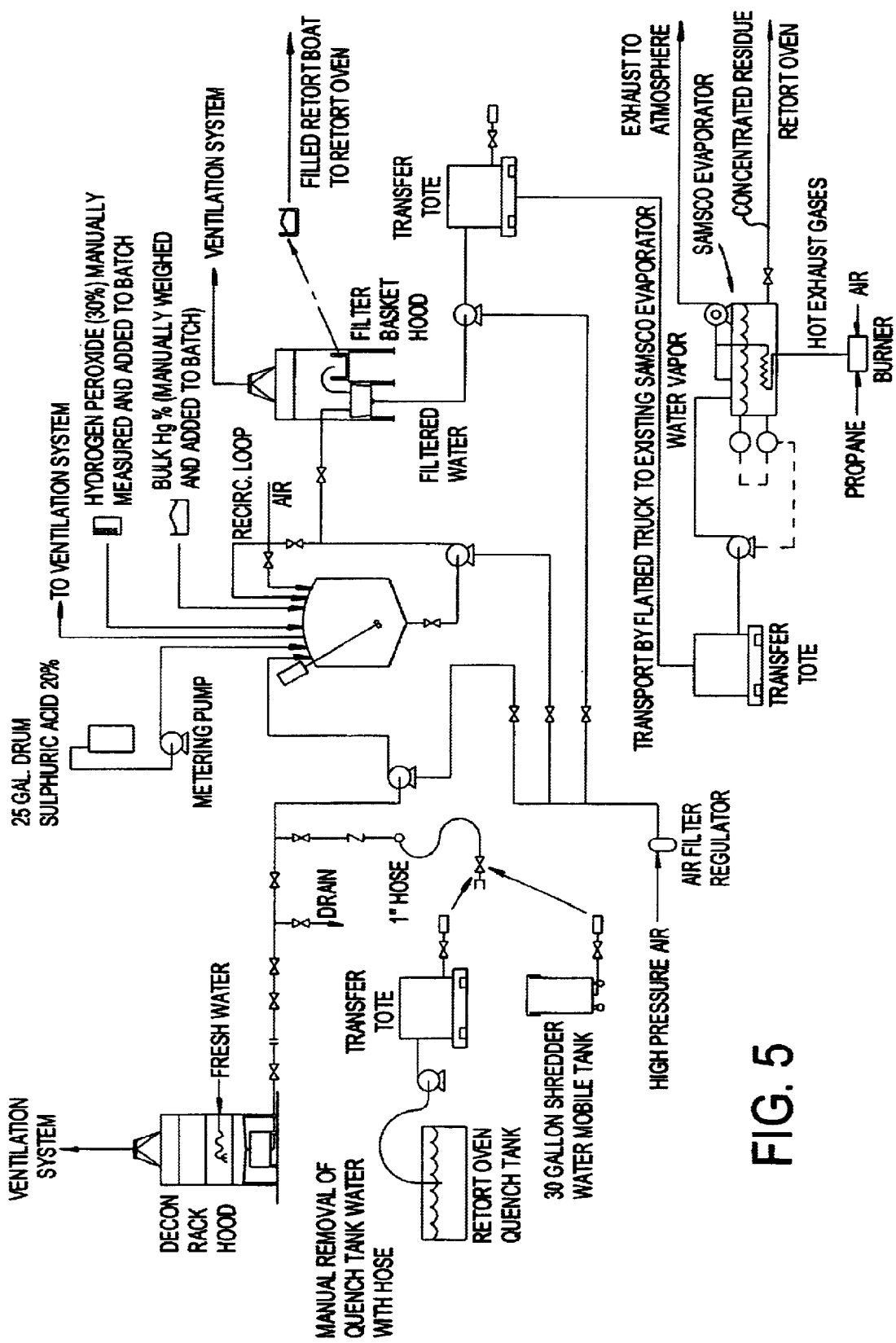
FIG. 5 is a plan view of the wastewater system and process.

FIG. 5 shows the wastewater treatment station. Wastewater that is generated from decontamination of the shredder, decontamination rack and retort quench tanks is collected and treated in a wastewater treatment station. Wastewater from the shredder is transported to the wastewater station with the shredder tote and is pumped into the treatment tank using an air diaphragm pump. Wastewater from the decontamination rack is collected in a decontamination rack sump tank. When the decontamination rack sump tank is full, its contents are pumped directly to the wastewater treatment tank. The retort quench tanks are drained by pumping into a transfer tote. The transfer tote is moved to the wastewater system and pumped into the treatment tank with an air diaphragm pump.

Wash water flows through a sludge clarification tank where heavy solids fall out. The clarification tank is sized to clarify the flow from the process stations. At the end of the day, the sludge in the solids clarification tank is dumped to a sludge filter basket. The sludge solution remains in the basket overnight as liquids filter through the filter fabric.

From the clarification tank, water flows into a larger recycle tank from which it is pumped back into the washer. The recycle tank is dosed with a sulfide-containing solution, which reacts with the dissolved mercury and precipitates the mercury as mercuric sulfide (cinnabar). The sludge in the recycle tank is dumped to the filter basket. The sludge solution remains in the basket as liquids filter through the filter fabric, drying the sludge. Liquids collect in the bottom of the basket and are pumped back to the recycle tank. A small sump is provided to collect any liquid mercury.

Dried sludge in the basket is transferred to a sealer container for storage. Eventually, it is retorted to remove the mercury in the sludge. Vacuum hoods capture the vapors from the water treatment process (e.g., the clarification tank, recycle tank, and sludge basket). The vapors are run through a demister prior to being routed to the emissions handling equipment. Water from the demister is routed to the recycle tank.

Wastewater treatment occurs in a 500-gallon cone bottom tank. The treatment includes the chemical oxidation of mercury with hydrogen peroxide to form divalent mercury. The divalent mercury is precipitated with HgX, and the wastewater pH is adjusted to <8 with sulfuric acid. After treatment, the wastewater is pumped through the sludge filter basket. The wastewater is passed through the filter basket and pumped into a transfer tote. Any sludge contained within the wastewater is trapped in the filter basket. The sludge is either transferred from the filter basket into a retort boat for processing in the retort, or containerized and disposed as a hazardous waste. The filtered wastewater is either managed as a hazardous waste or piped to an evaporator for evaporation.

Air emissions include emissions from the retort and vapor streams discharged from the ventilation system that are used to capture vapor emissions from the processing areas. The primary volatile constituent of concern is elemental mercury that may be present in spent button cells. In addition, retort emissions may include volatile organic constituents due to minor combustion and/or volatilization of residual epoxy and plastic on the button cells. The ventilation system ensures proper handling of these emissions.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A battery reclamation system for recycling a battery having a case that encloses a cell, comprising a freezing chamber for freezing the battery, a cracking station for cracking the battery case and removing the battery cell, a shredder for shredding the battery cell, and a retort oven for retorting the shredded battery cell.

2. The battery reclamation system of claim 1, wherein the retort oven removes mercury contained within the shredded battery cell.

3. The battery reclamation system of claim 1, wherein the battery is a mercury-zinc battery.

4. The battery reclamation system of claim 1, wherein the battery is a mercury-cadmium battery.

5. The battery reclamation system of claim 1, wherein said cracking station comprises a pneumatic hammer.

6. The battery reclamation system of claim 1, wherein said cracking station comprises an actuator.

7. A battery reclamation system for recycling a battery having a case that encloses a cell, comprising a disassembly station for removing the case and separating silver contained within the battery, and a retort oven for retorting the battery cell.

8. The battery reclamation system of claim 7, wherein the battery is a silver-zinc battery.

9. A method for recycling a battery having a casing enclosing a cell, comprising freezing the battery casing, cracking the frozen casing, removing the cell from the cracked casing, shredding the cell, and retorting the shredded cell.

10. The method of claim 9, wherein the battery is a mercury-zinc battery.

11. The method of claim 9, wherein the battery is a mercury-cadmium battery.

12. The method of claim 9, wherein the retorting removes mercury contained in the battery.

13. A method for recycling a battery containing silver and having a casing enclosing a cell, the method comprising removing the casing, separating the silver, and retorting the cell.

14. The method of claim 13, wherein the battery is a silver-zinc battery.

15. The method of claim 13, wherein the retorting removes mercury contained in the battery.

16. A retort system for removing an element from a material, the system comprising: an oven for heating the material so that the element enters a vapor form, a first quench tank receiving the element in vapor form from said oven, said first quench tank cooling the element to a liquid form, and a second quench tank having an air distributor with orifices, wherein the element that remains in the vapor form in said first quench tank is passed from said first quench tank through the orifices of said air distributor.

17. The system of claim 16, wherein said first quench tank contains water, and the element in vapor form is passed from said oven into the water of said first quench tank.

18. The system of claim 17, further comprising cooling coils located in said first quench tank for cooling the water contained in said first quench tank.

19. The system of claim 16, wherein said first quench tank has a sloped bottom for collecting the element in the liquid form.

20. The system of claim 16, wherein the element comprises mercury.

21. The system of claim 16, wherein the material comprises a battery cell.

22. A retort system for removing an element from a material, the system comprising an oven for heating the material so that the element enters a vapor form, and a first quench tank receiving the element in vapor form from said oven, said first quench tank containing water and passing the vapor form of the element from the oven into the water to cool the element to a liquid form, the retort system further comprising cooling coils located in said first quench tank for cooling the water contained in said first quench tank.

23. The system of claim 22, wherein said first quench tank has a sloped bottom for collecting the element in the liquid form.

24. The system of claim 22, wherein the element comprises mercury.

25. The system of claim 22, wherein the material comprises a battery cell.

* * * * *